United States Patent [19]

DesJardins

[11] Patent Number: 5,153,711
[45] Date of Patent: Oct. 6, 1992

[54] RECURSIVE VIDEO HUE ROTATIONS TO OBTAIN A RAINBOW-LIKE DECAYING AFTER-IMAGE

[75] Inventor: Philip A. DesJardins, Nevada City, Calif.

[73] Assignee: The Grass Valley Group, Inc., Nevada City, Calif.

[21] Appl. No.: 760,669

[22] Filed: Sep. 16, 1991

[51] Int. Cl.[5] .............................................. H04N 9/74
[52] U.S. Cl. ...................................... 358/22; 358/182
[58] Field of Search ............... 358/22, 160, 182, 28, 358/21 R

[56] References Cited

U.S. PATENT DOCUMENTS

| | | | |
|---|---|---|---|
| 4,554,576 | 11/1985 | Kao | 358/28 |
| 4,558,351 | 12/1985 | Fling et al. | 358/28 |
| 4,752,826 | 6/1988 | Barnett | 358/140 |
| 4,851,912 | 7/1989 | Jackson et al. | 38/183 |
| 4,951,144 | 8/1990 | DesJardins | 358/182 |
| 4,974,083 | 11/1990 | Bloomfield et al. | 358/160 |
| 5,010,407 | 4/1991 | Trytko | 358/22 X |

*Primary Examiner*—James J. Groody
*Assistant Examiner*—Mark R. Powell
*Attorney, Agent, or Firm*—Boulden G. Griffith

[57] ABSTRACT

An apparatus creates a "rainbow-like" effect in a decaying video afterimage by including a chrominance phase rotator within a recursive video effects loop, so that the hue of the afterimage is recursively altered as it decays. The chrominance phase rotator can be placed anywhere within the recursive loop, and can also be combined with a blurring effect and/or the decay factor multiplication needed for the basic recursive circuit. Several variants of the circuitry for providing chrominance phase rotation are provided; some suitable for processing cosited chrominance components, others suitable for processing noncosited chrominance components. Additional variations conserve the number of parts required at the expense of technical color accuracy by making simplifying assumptions. A variation is also provided on a folded FIR filter that was disclosed in a previous patent for blurring video trails, the variation combining the blurring function and the chrominance phase rotation function to produce blurred and rotated chrominance values concurrently. Similarly, placing a saturation modification circuit within the recursive video loop produces increasing or decreasing color effects as the afterimage decays.

20 Claims, 9 Drawing Sheets

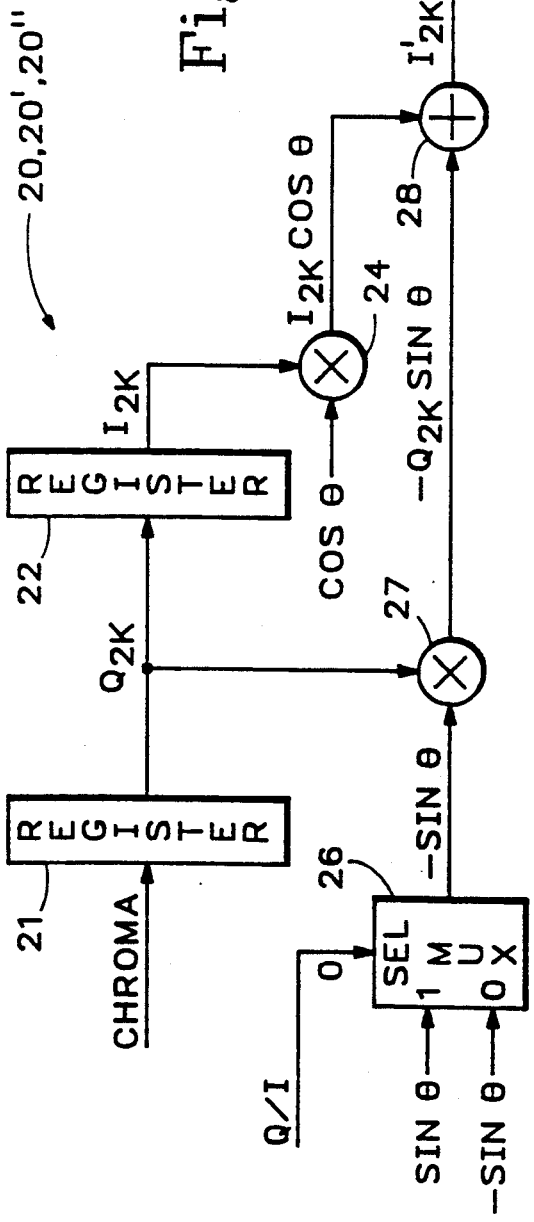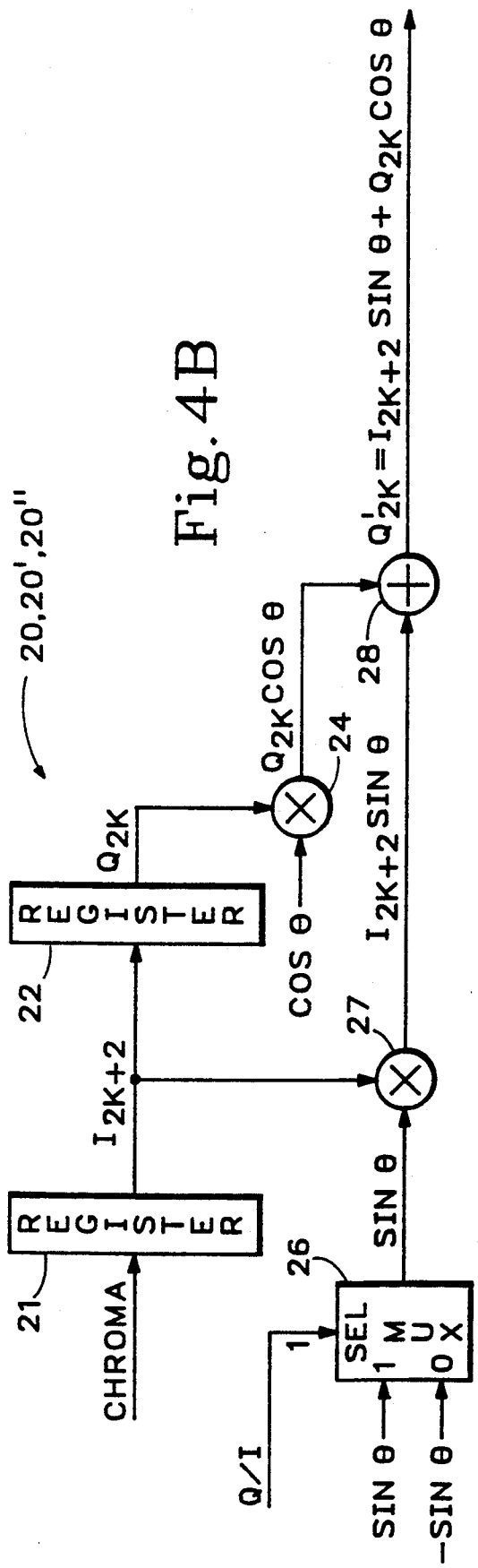

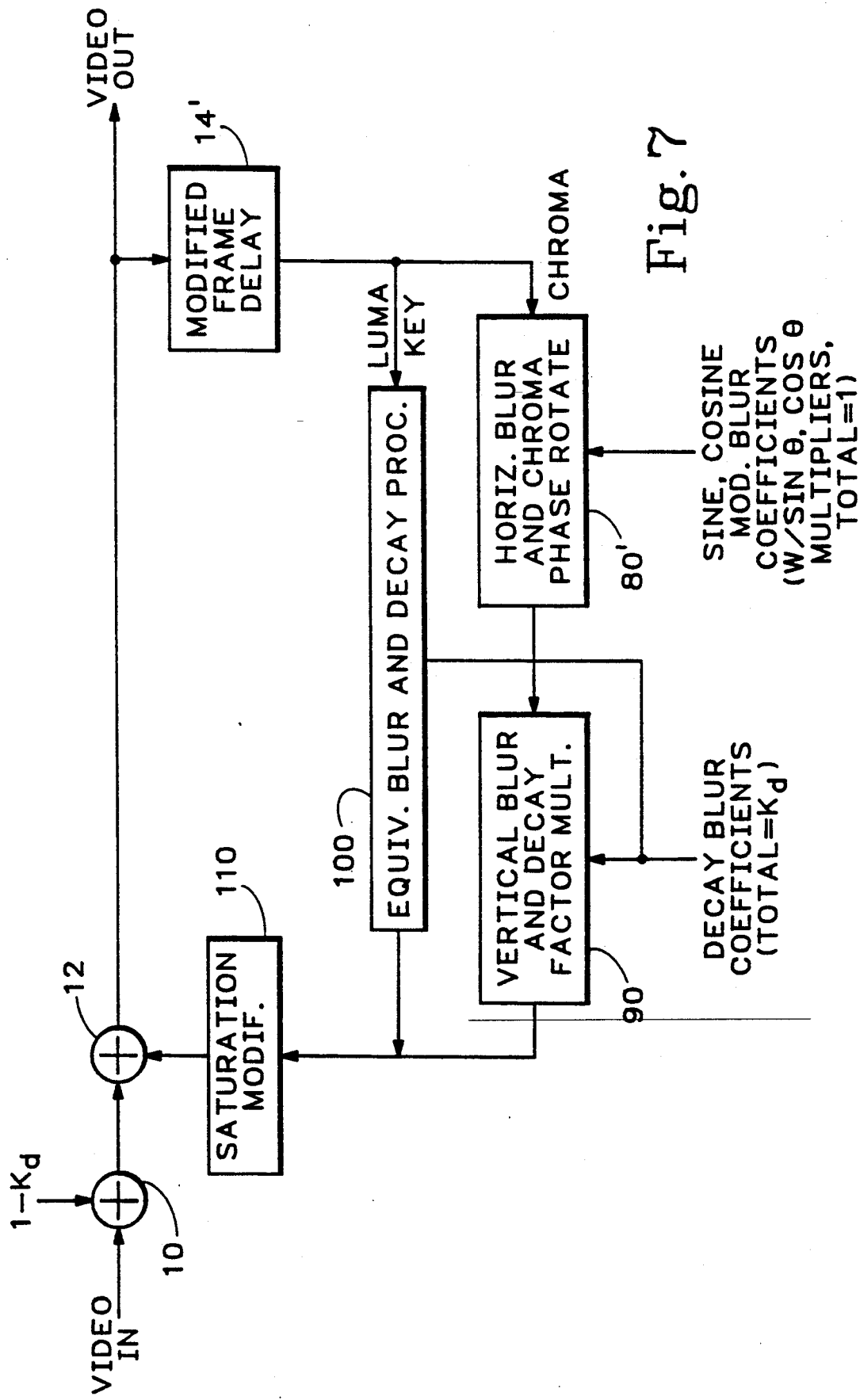

RECURSIVE VIDEO HUE ROTATIONS TO OBTAIN A RAINBOW-LIKE DECAYING AFTER-IMAGE

BACKGROUND OF THE INVENTION

This invention relates to video special effects, and more particularly to recursive video effects that provide a "trail" or "persistence" to video images.

Recursive effects are commonly used in the video effects industry to leave a decaying after-image of an object as it moves within a field of video. Such an effect simulates a high persistence monitor, where the "persistence" is not provided by a high persistence phosphor, but rather by a digital video effect.

FIG. 1 shows a prior art circuit suitable for producing a decaying after-image or trail. Multiplier 10 multiplies incoming digital video data by one minus a decay factor, i.e., the complement of the decay factor, $1-K_d$. Multiplier 16 multiplies digital key and video data, separated into luminance and chrominance components, from frame delay 14 by the decay factor, $K_d$. Summing circuit 12 adds the input video image data that has been multiplied by $1-K_d$, to the delayed video image that has been multiplied by $K_d$. The resulting video output, which is normalized to one, is then fed back into the frame delay 14, as well as being used downstream from this effect. Thus, as an object in the video image moves, its decayed afterimage is recursively mixed back in with its present image, producing the desired effect, since older versions of the object's image are increasingly attenuated by the decay factor as they pass through the recursive loop.

While the form of combining means 11 that consists of multiplier 10, summing circuit 12, and multiplier 16 shown in FIG. 1 (and FIG. 2 below) is shown as a conceptually simple way to close the recursive loop, other methods are in fact frequently employed. A more sophisticated alternative is described in U.S. Pat. No. 4,851,912 to Jackson et al for "Apparatus for Combining Video Signals", hereby incorporated by reference. Using that approach, the video combination that closes the recursive loop is accomplished using a priority-key signal.

While there are presently several incidental variations on this basic approach, such as architectures that allow "strobe" effects or structures that use a field store instead of a frame store, these variations are unimportant to the practice of the invention to be described below. For reference and background, however, the reader's attention is directed to U.S. Pat. No. 4,752,826 to Barnett, for "Intra-Field Recursive Interpolator", hereby incorporated by reference.

None of the presently known variations on recursive video effects alter the color of the decaying afterimage.

In the prior art, chrominance phase rotation has been used to perform color correction and alteration. For example, U.S. Pat. No. 4,554,576 to Kao for "Auto Flesh Circuitry as for a Digital TV Receiver" describes circuitry for hue control using hue vector rotation. Similarly, U.S. Pat. No. 4,558,351 to Fling et al for a "Hue Correction Circuit for a Digital TV Receiver" also describes circuitry for hue control using hue vector rotation.

SUMMARY OF THE INVENTION

In accordance with the invention, there is provided an apparatus that creates a rainbow-like effect in a decaying video afterimage. In this apparatus, a chrominance phase rotator is included within a recursive video effects loop, so that the hue of the afterimage is altered as it decays. The chrominance phase rotator can be placed anywhere within the recursive loop, and can also be combined with a blurring effect and/or the decay factor multiplication needed for the basic recursive circuit.

In accordance with the invention, there are also provided several variants of circuitry suitable for providing chrominance phase rotation; some suitable for processing cosited chrominance components, others suitable for processing noncosited chrominance components. Additional circuit variations are provided that utilize simplifying assumptions to conserve the number of parts required at the expense of technical color accuracy.

Also in accordance with the invention, there is provided a variation on a folded FIR filter used for producing a blurring effect on video trails (as described in a previous patent), the variation suitably combining the blurring function and the chrominance phase rotation function to produce blurred and rotated chrominance values concurrently.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

BRIEF DESCRIPTION OF THE DRAWINGS

FIGS. 4A and 4B are block diagrams of another version of the chrominance phase rotation circuit that is simplified by a convenient assumption;

FIG. 7 is a block diagram of a recursive loop that performs recursive decaying trails, recursive chrominance phase rotation and recursive blurring concurrently in one circuit.

DETAILED DESCRIPTION

Figure 1:
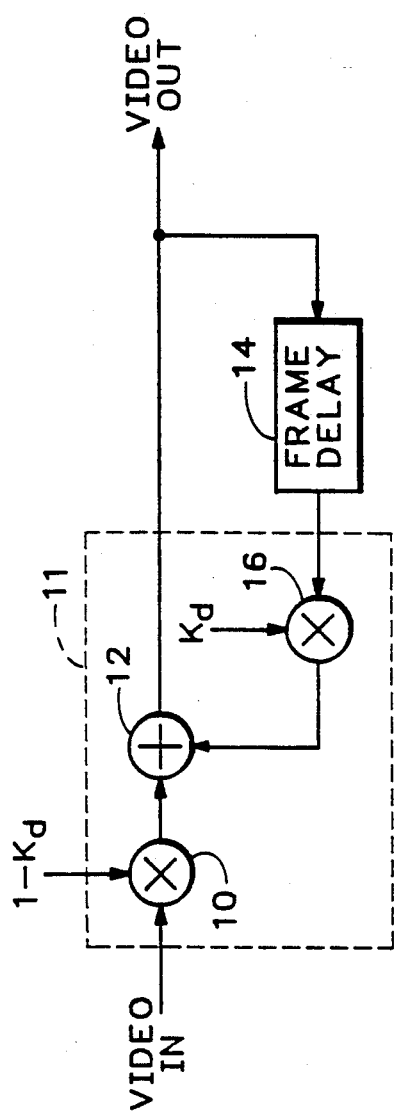
FIG. 1 is a block diagram of a recursive memory loop circuit for producing decaying afterimages.

The video processed by the recursive memory loop circuit shown in (prior art) FIG. 1 consists of both luminance and chrominance information, and both are treated the same way, as described above.

Luminance information represents the brightness of the image. Chrominance information represents the color of the image and has two components that are orthogonal to each other and whose resultant vector defines the color saturation level by its magnitude and the hue of the color by its phase angle and may be represented by "A" and "B". In NTSC (National Television System Committee) video the two chrominance components are known as I and Q. In other video standards the chrominance components have different names and technical definitions.

Figure 2:
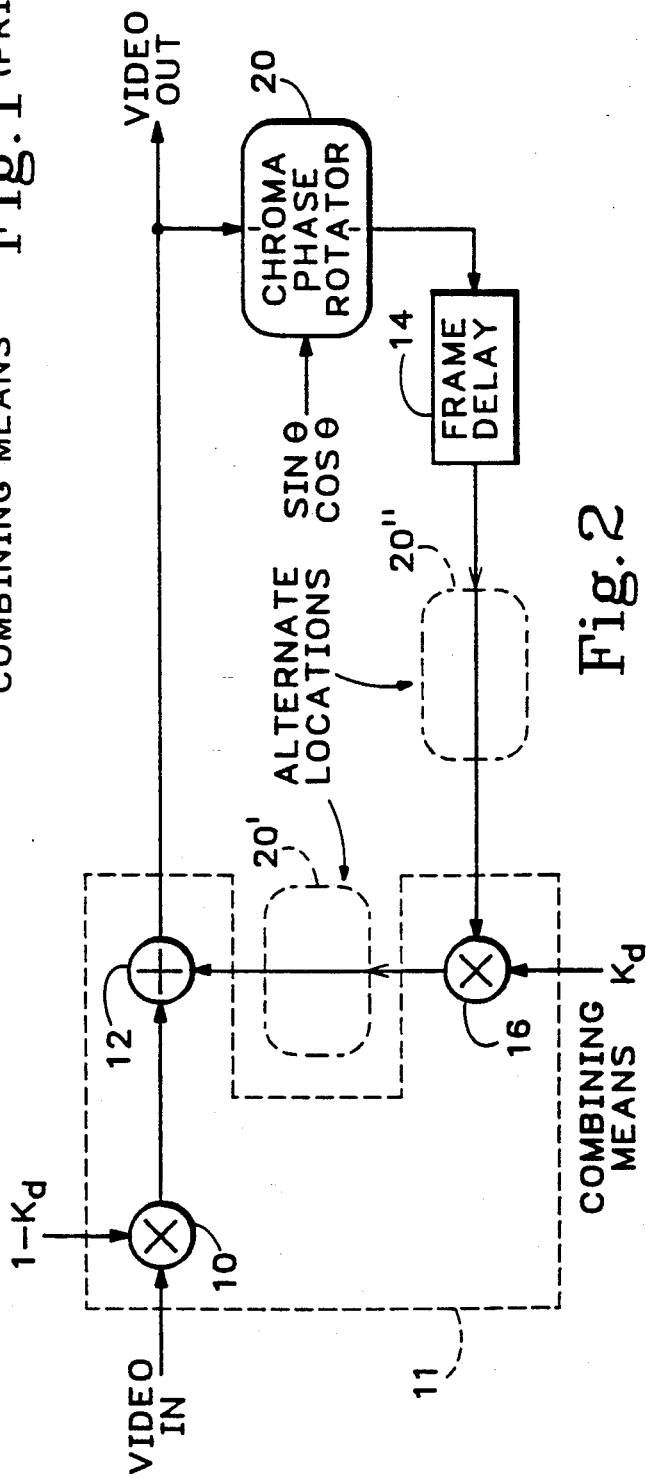
FIG. 2 is a block diagram of a circuit for producing recursive video chrominance phase rotations according to the present invention.

Referring now to FIG. 2, producing recursive video hue rotations can be accomplished by inserting a chrominance phase rotation circuit 20 in the recursive video memory loop at any of the three locations shown, 20, 20' or 20".

In video effects systems digitally processing NTSC data, the I and Q data is often interleaved, with the information alternating each sample between I and Q. In component signals according to the NTSC D1 standard, the chrominance signal components I and Q are contemporaneously derived or "cosited" with one another, i.e., sampled at the same time and then shifted apart in time in order to be interleaved. An example sequence of sample pairs consists of $I_0, Q_0, I_2, Q_2, I_4, Q_4, \ldots I_{2k}, Q_{2k}$. Note that the samples with odd indexes do not exist; they were either not sampled or their samples were discarded. In other formats, especially decoded composite signals, the chrominance component pairs are not cosited. This distinction between cosited and non-cosited chrominance components is the basis for some of the differences between the various implementations of the invention that are described below.

Figure 3A:
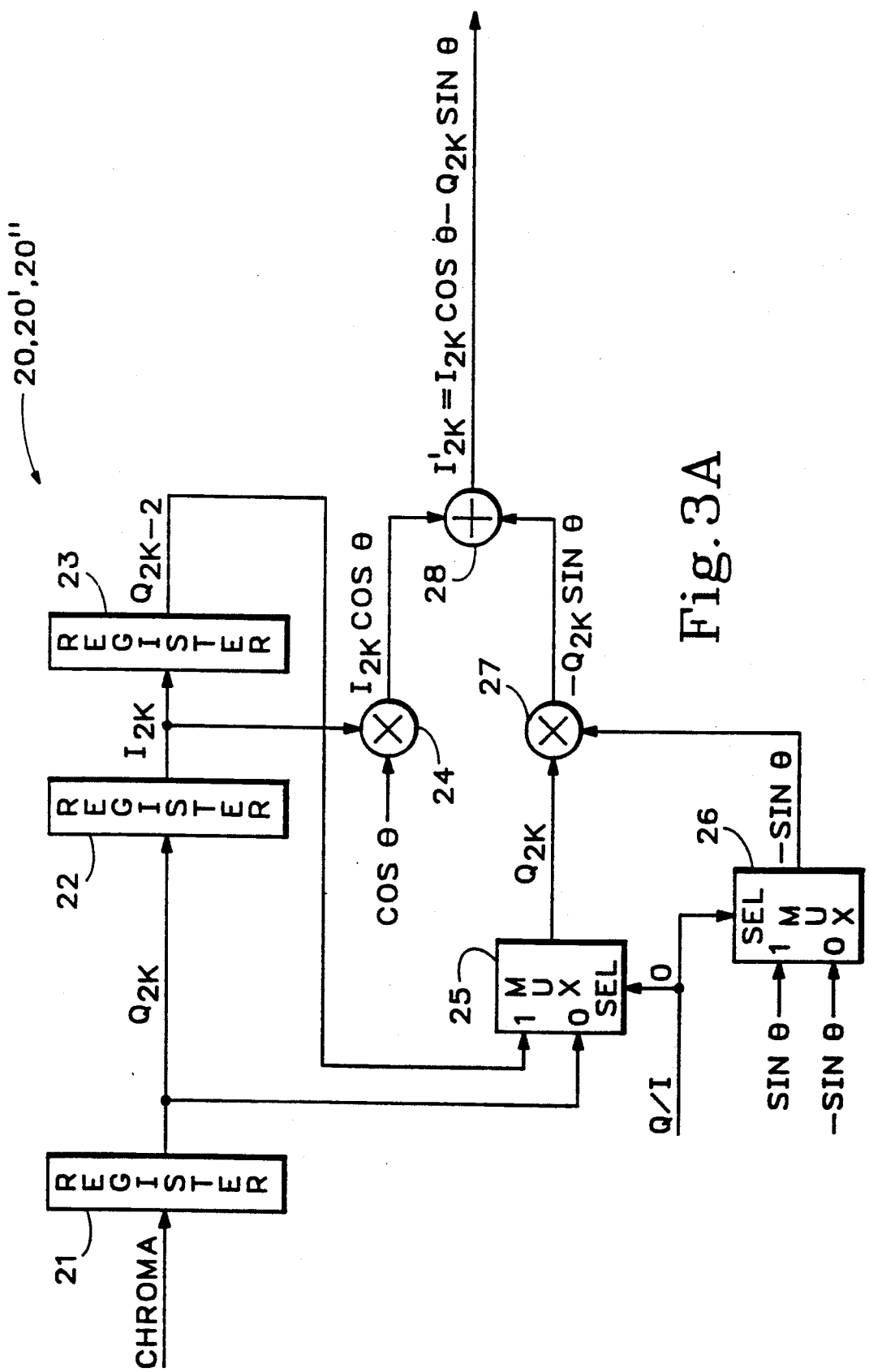
FIGS. 3A and 3B are block diagrams of one version of the chrominance phase rotation circuit shown in FIG. 2, with FIG. 3B showing the signals present one clock cycle after those shown in FIG. 3A.
Figure 3B:
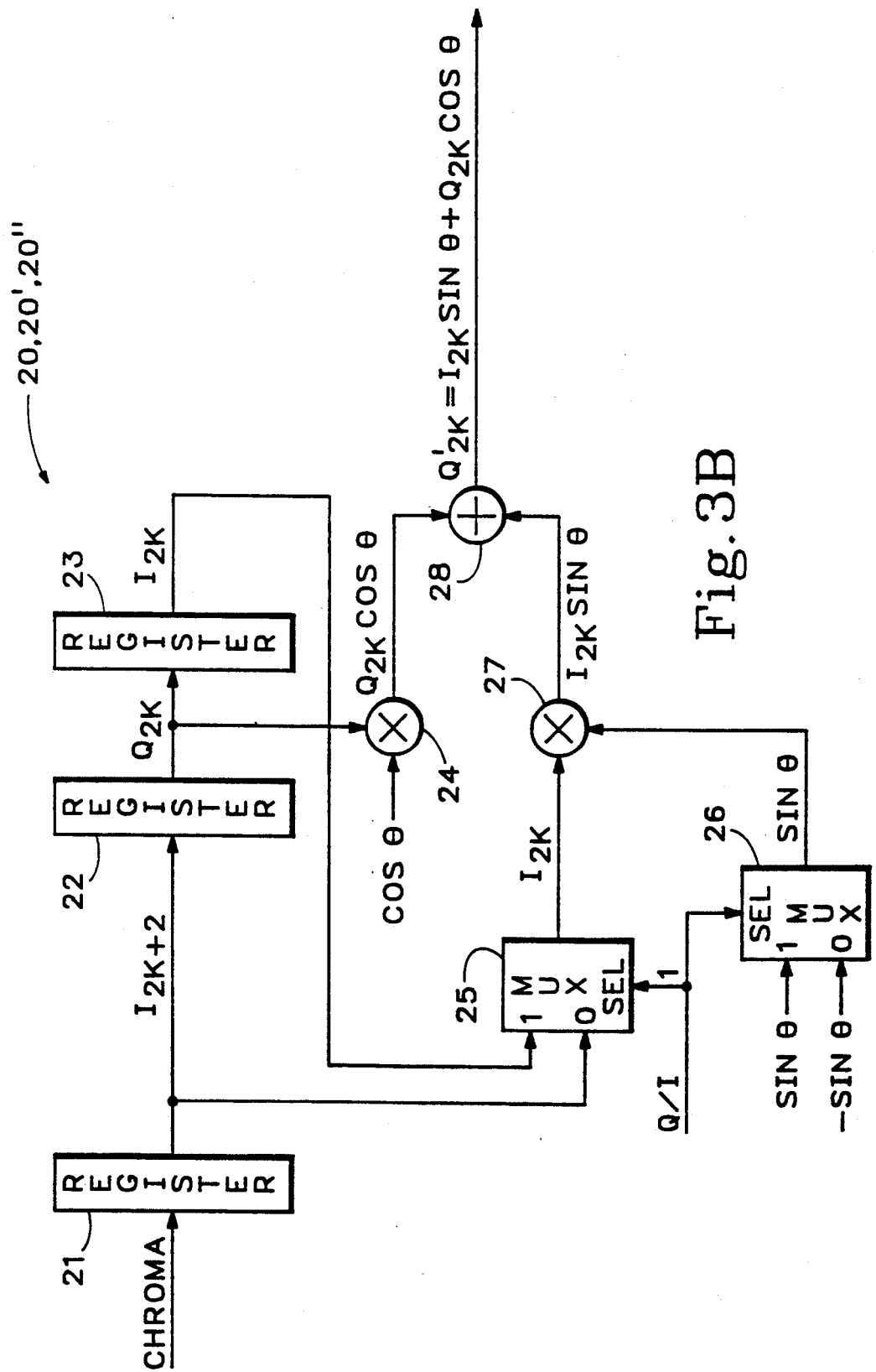

FIGS. 3A and 3B show one of several possible implementations of the chrominance phase rotation circuit 20,20',20" shown in FIG. 2. This version is appropriate for cosited chrominance components, as is the version described in connection with FIGS. 4A and 4B. FIG. 3A shows this first version of the circuit while it is calculating a rotated I value, $I'_{2k}$, while FIG. 3B shows it while it is calculating a rotated Q value, $Q'_{2k}$. Both FIGS. show the same circuitry, but show it with different data and control signal states, as they occur during alternate system clock cycles.

Chrominance information moves through registers 21, 22 and 23 at the rate of the system clock, which is the luminance sample rate. Multiplexer 25 has as its "0" input the output of register 21, and as its "1" input the output of register 23. The output of multiplexer 25 is applied to one of the inputs of multiplier 27. Multiplier 27 has as its other input the output of multiplexer 26. Multiplexer 26 has as its "0" input the negative of the sine of an angle $\theta$, and as its "1" input the positive of the sine of the same angle. The output of multiplier 27 is applied to one of the inputs of summing circuit 28. The other input to summing circuit 28 is the output of multiplier 24. Multiplier 24 has the output of register 22 as one input and the cosine of the angle $\theta$ as its other input. The output of the summing circuit 28 is the output of the chrominance phase rotation circuit 20,20',20".

In FIG. 3A the multiplexer select signal, Q/I, is low, and this configures the circuit to calculate the value of $I'_{2k}$ by selecting the "0" inputs of multiplexers 25 and 26 as their outputs. During times when Q/I is low, the "0" input of multiplexer 25 is $Q_{2k}$, and that is the value supplied at its output, that output being one of the inputs to multiplier 27. The "0" input to multiplexer 26 is $-\sin(\theta)$, and this is the value supplied at its output, which is the other input to multiplier 27. Thus, the output of multiplier 27 is $-Q_{2k} \sin(\theta)$, and this is the value applied to one input of summing circuit 28. The other input to summing circuit 28 is the output of multiplier 24, which at this time is $I_{2k} \cos(\theta)$. Consequently, the output of the summing circuit 28 and of the whole chrominance phase rotation circuit 20,20',20" during the intervals when Q/I =0 is:

$$I'_{2k}=I_{2k} \cos(\theta) - \text{pu } Q_{2K} \sin(\theta)$$

In FIG. 3B the multiplexer select signal, Q/I, is high, and the circuit is configured to calculate the value of $Q'_{2k}$ by the selection of the "1" inputs of multiplexers 25 and 26 as their outputs. One system clock pulse has occurred since the data was as it is shown in FIG. 3A and the I and Q values in registers 21, 22 and 23 have advanced one register location.

With Q/I high, the "1" input to multiplexer 25, which is the output of register 23, $I_{2k}$, is selected as the multiplexer's output. Multiplexer 26 is also producing its "1" input, the sine of $\theta$, as its output. The output of multiplier 27 is then $I_{2k} \sin(\theta)$, and this is one of the inputs to summing circuit 28. The other input to summing circuit 28 is $Q_{2k} \cos(\theta)$, since multiplier 24 is now receiving $Q_{2K}$ from the output of register 22 and the other input to multiplier 24 is the cosine of $\theta$. Consequently, the output of summing circuit 28 and of the whole chrominance phase rotation circuit 20,20',20" during the intervals when $Q/I=1$ is:

$$Q'_{2k}=I_{2k} \sin(\theta) + Q_{2k} \cos(\theta).$$

Perfect color accuracy is not actually required in most of the applications envisioned for the use of this invention. Frequently in digital video effects the goal is to provide an interesting image rather than precise color, so a simplification in hardware may well be justified even if the resulting color is not the result of precisely the same chrominance phase rotation on each sample. For this reason, cosited chroma can be treated as non-cosited, and vice-versa, according to whatever leads to the greatest simplification in a particular context.

Referring now to FIGS. 4A and 4B, a simplifying assumption slightly reduces the hue rotation accuracy, but provides a significant reduction in the hardware required to implement the chrominance phase rotation circuit 20,20',20". By assuming that $I_{2k+2}$ is an adequate substitute for $I_{2k}$ in the calculation of $Q'_{2k}$, register 23 and multiplexer 25 can be eliminated from the circuit shown in FIGS. 3A and 3B. As shown in FIG. 4A, this does not affect the calculation of $I'_{2k}$ during the intervals when Q/I is low. However, as can be seen in FIG. 4B, during the interval when Q/I is high and $Q'_{2k}$ is being calculated, the absence of register 23 and multiplexer 25 means that $I_{2k}$ is no longer available and $I_{2k+2}$ is used instead.

The implementations of the chrominance phase rotation circuit 20,20',20" described above are suitable for processing chrominance component samples that were cosited. However, as was mentioned above, not all chrominance signals contain cosited chrominance components. Video signals that are decoded from composite video contain non-cosited chrominance component samples. In these signals, the samples making up a sample "pair" do not correspond to the same sampling time, so the concept of "pair" loses its meaning, since an I sample is as related to the Q sample before it as it is to the one behind it. Since first one component is sampled and then the other, a sample sequence has the form: $I_0, Q_1, I_2, Q_3, \ldots I_{2k}, Q_{2k+1}$. Thus, each sample of one type corresponds in its sampling time to the average of the sampling times of the samples of the other type that immediately precede and follow it.

Non-cosited chrominance data complicates the rotation process because the equation for $I'_{2k}$ needs the values of $I_{2k}$ and $Q_{2k}$, and $Q_{2k}$ does not exist. Similarly, the equation for $Q'_{2k+1}$ requires the values for $Q_{2k+1}$ and $I_{2k+1}$, and $I_{2k+1}$ does not exist. This problem can be handled in a number of ways, but the most accurate is to calculate an interpolated value for the missing samples and use them in the rotation formula. The simplest way to calculate an interpolated value is to average the two adjacent samples of the same component i.e.:

$$Q_{2k} = (Q_{2k-1} + Q_{2k+1})/2$$

Figure 5A:
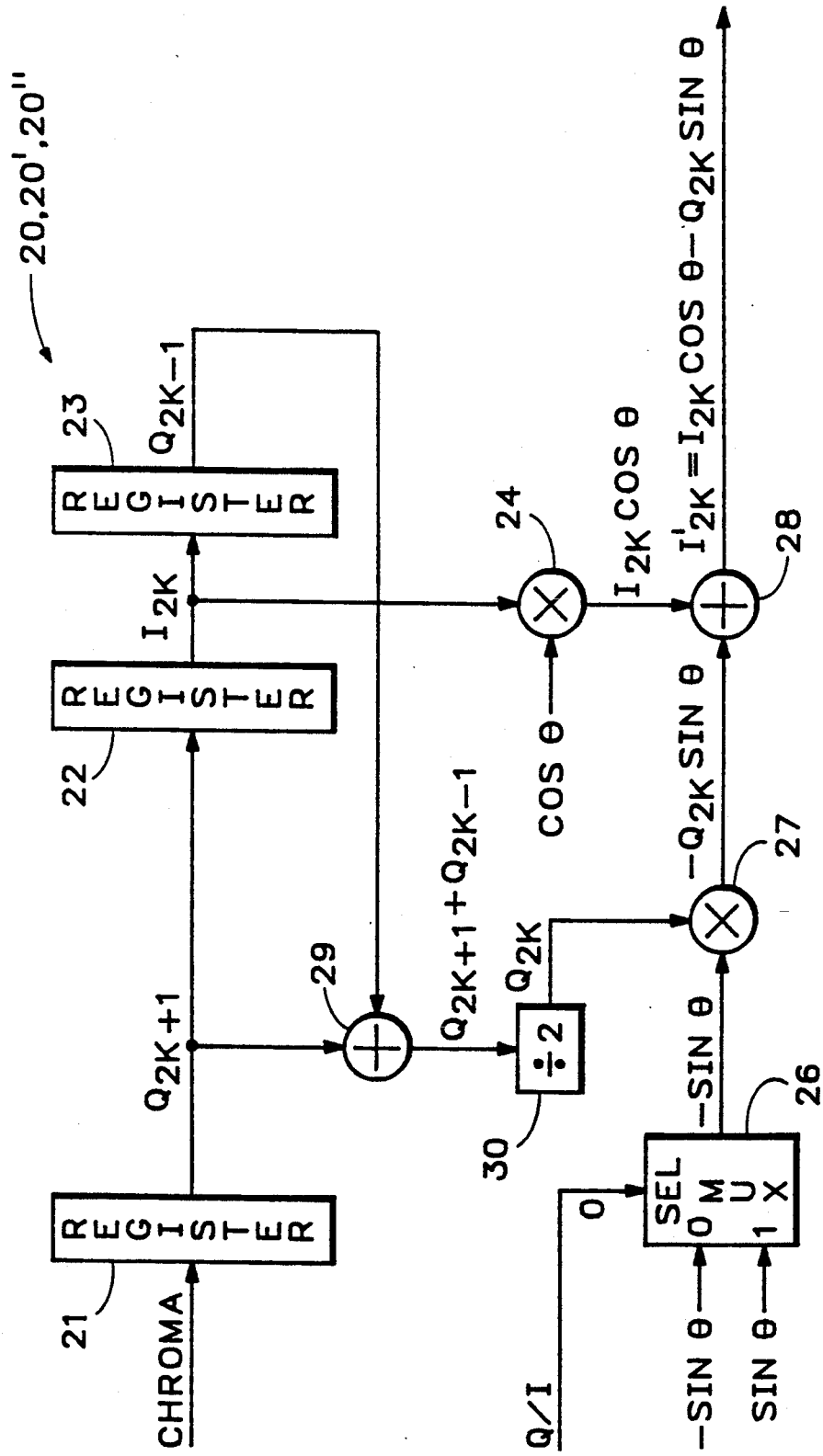
FIGS. 5A and 5B are block diagrams of another version of the chrominance phase rotation circuit that has been modified to handle non-cosited chrominance components.
Figure 5B:
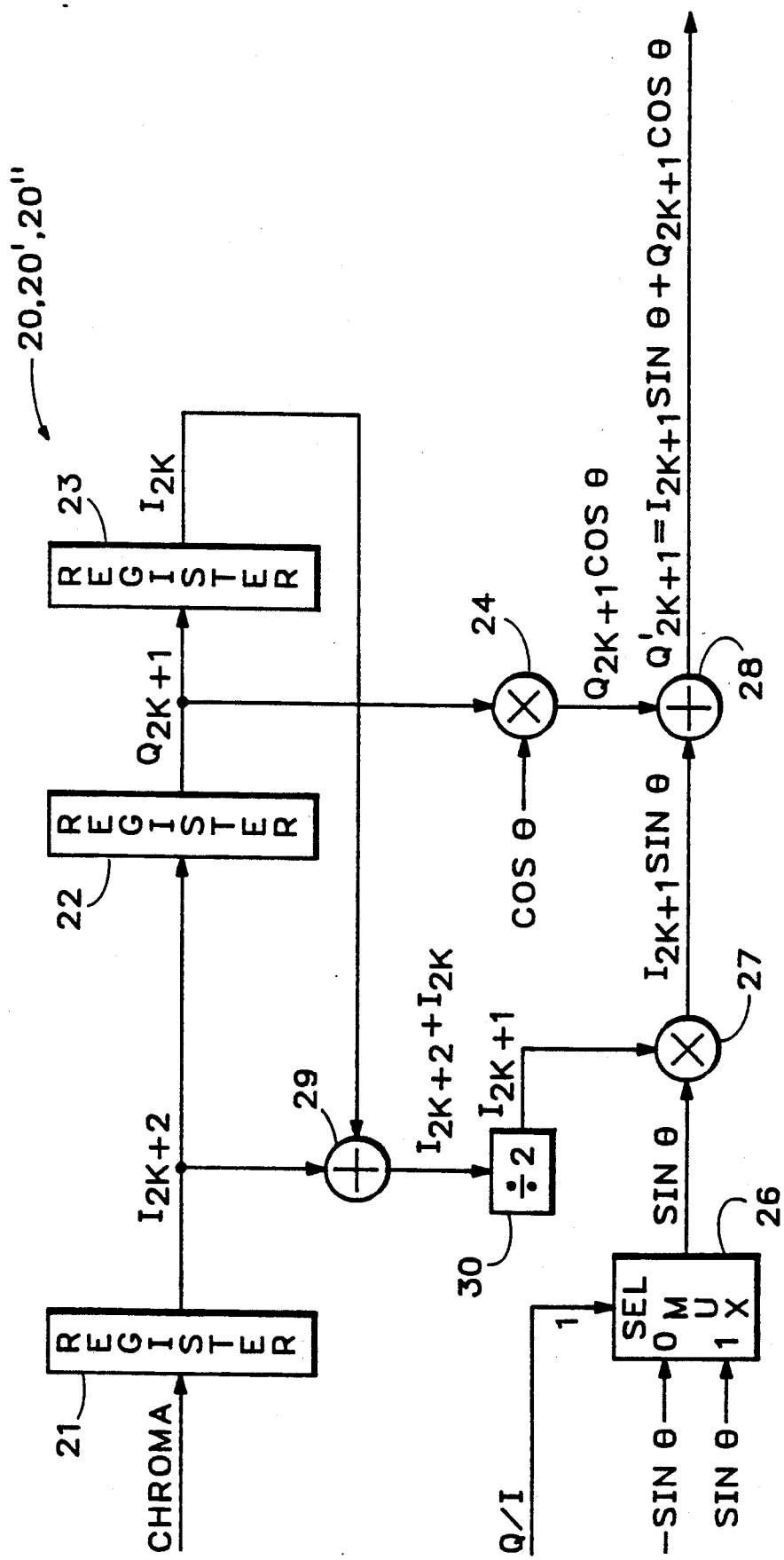

FIGS. 5A and 5B show a version of the chrominance phase rotation circuit that has been modified to handle non-cosited chrominance components by the simple interpolative technique of averaging adjacent samples of the same component according to the equation above. To accomplish this averaging, register 23 is required again, as well as summing circuit 29 and divide-by-two circuit 30.

In FIG. 5A it can be seen that while multiplier 24 is multiplying the $I_{2k}$ value held in register 22 by the cosine of $\theta$ value on its other input, multiplier 27 is multiplying the $Q_{2k}$ value on one of its inputs by the negative sine of $\theta$ value on its other input. Now, however, the $Q_{2k}$ value is being derived from the averaging of the $Q_{2K+1}$ value held by register 21 and the $Q_{2K-1}$ value held by register 23 through the operation of summing circuit 29 and divide-by-2 circuit 30.

Similarly, in FIG. 5B, while multiplier 24 is multiplying the $Q_{2k+1}$ value held in register 22 by the cosine of $\theta$ value on its other input, multiplier 27 is multiplying the $I_{2k+1}$ value on one of its inputs by the positive sine of $\theta$ value on its other input. Again, though, the $I_{2k+1}$ value is being derived from the averaging of the $I_{2k+2}$ value held by register 21 and the $I_{2k}$ value held by register 23 through the operation of summing circuit 29 and divide-by-2 circuit 30.

Thus, the circuitry shown in FIGS. 5A and 5B produces first an $I'_{2k}$ a $Q'_{2k+1}$, then an $I'_{2k+2}$ value and so on, according to the following equations:

$$I_{2k}' = I_{2k}\cos(\theta) + \frac{(Q_{2k-1} + Q_{2k+1})}{2} * \sin(\theta)$$

$$Q_{2k+1}' = \frac{(I_{2k} + I_{2k+2})}{2} * \sin(\theta) + Q_{2k+1}\cos(\theta)$$

If more sophisticated interpolation is desired, summing circuit 29 and divide-by-2 circuit 30 can be replaced with with a more complicated interpolation circuit and additional registers can be added to supply this more complicated interpolation circuit with the additional sequential chrominance samples required by more sophisticated interpolation techniques.

Figure 6A:
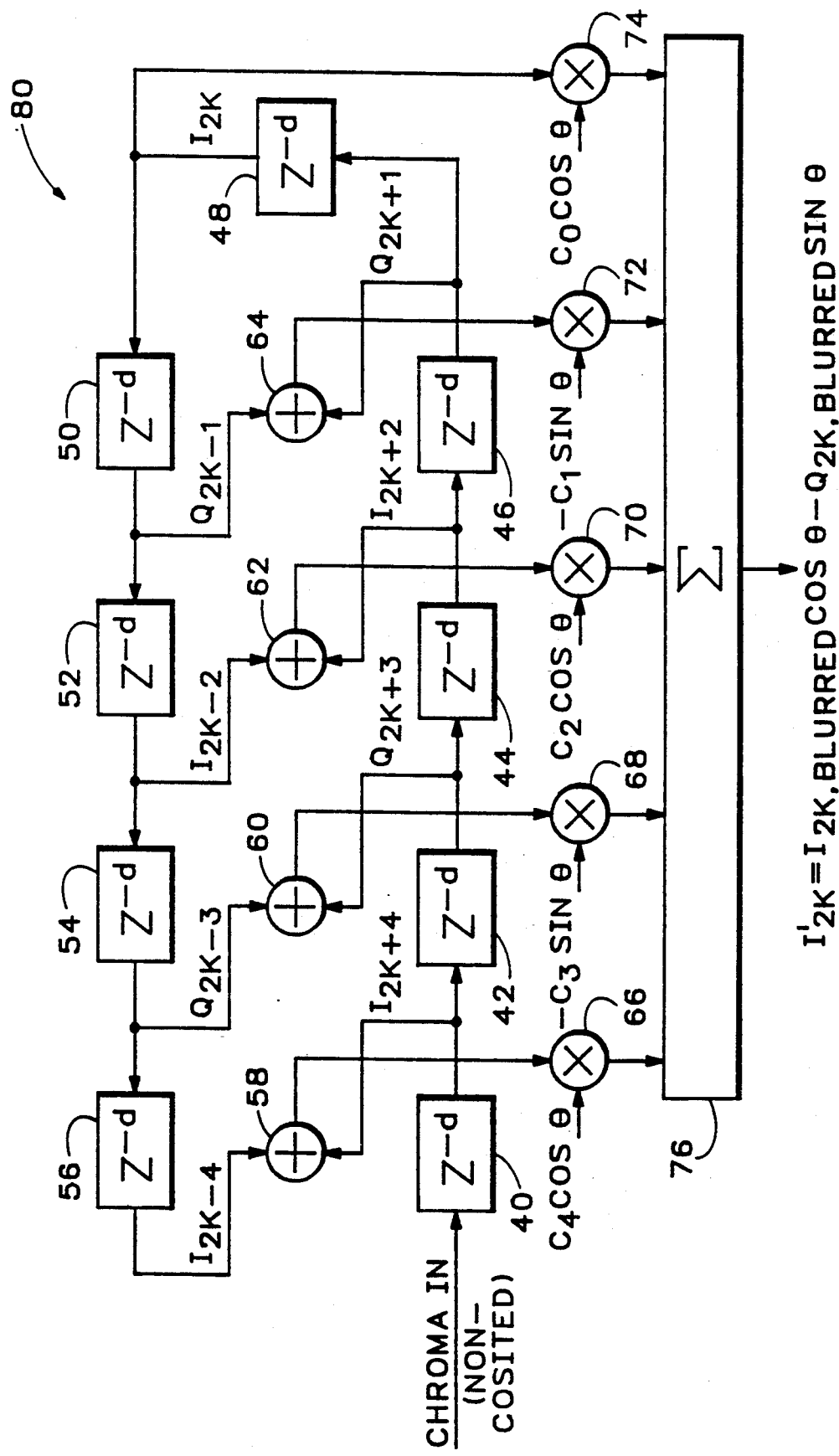
FIGS. 6A and 6B are block diagrams of folded FIR filter suitable for implementing chrominance phase rotation in conjunction with a horizontal recursive blur effect.
Figure 6B:
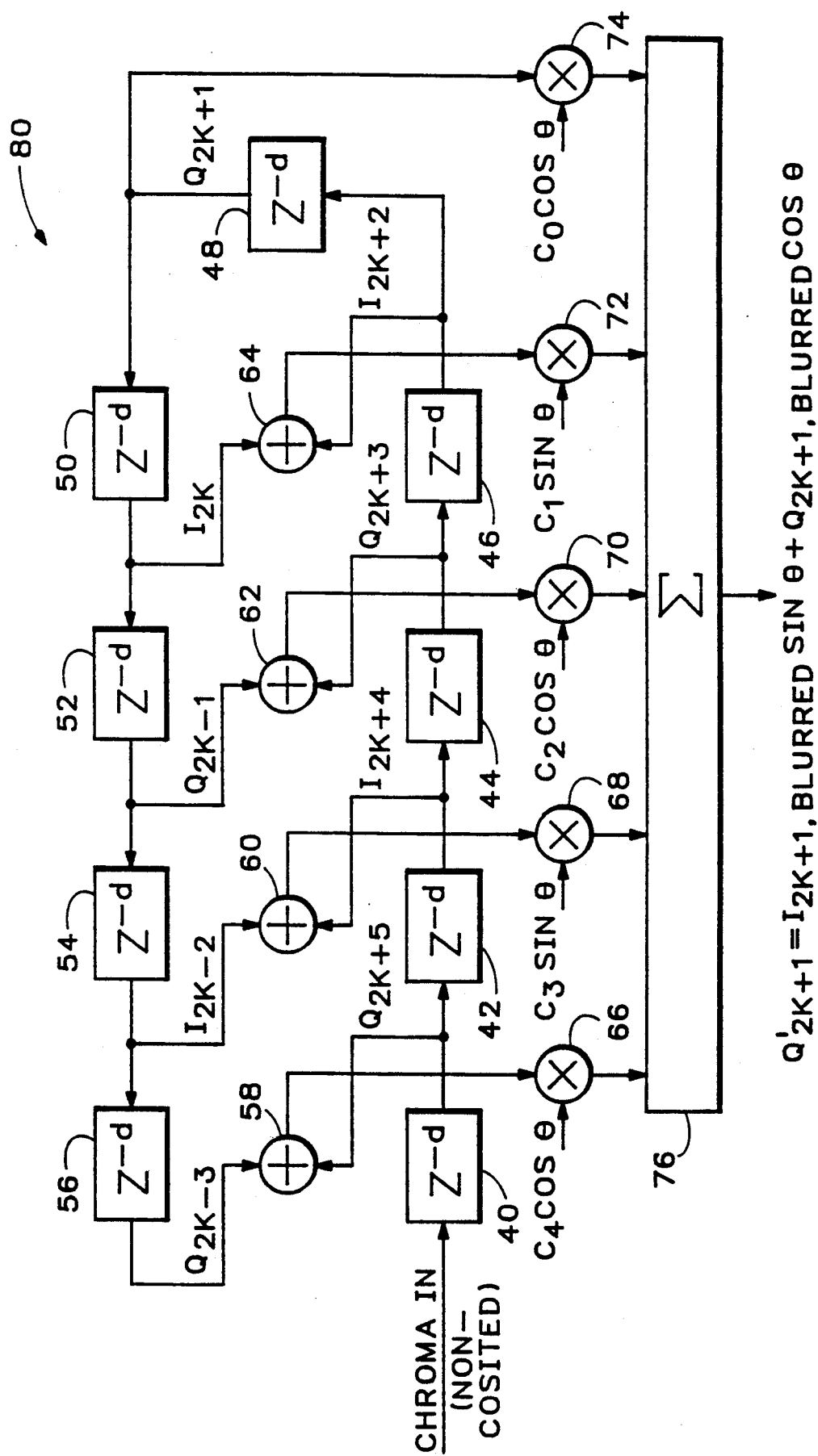

Conversely, since, as was mentioned above in connection with FIGS. 4A and 4B, perfect color accuracy is not actually required in most of the applications envisioned for the use of this invention, the absence of cositing can be ignored and the circuit shown in FIGS. 4A and 4B can be used instead of the circuit shown in FIGS. 6A and 6B. When this approach is used, the following equations describe the output produced at the times shown in FIGS. 4A and 4B, respectively:

$$I'_{2k} = I_{2k}* \cos(\theta) - Q_{2k-1}* \sin(\theta)$$

$$Q'_{2k+1} = I_{2k-2}* \sin(\theta) + Q_{2k+1}* \cos(\theta)$$

In practice it has been found that the rainbow trails of the present invention look better to most viewers when they are implemented in conjunction with a "recursive blur" effect. Means for producing a recursive blur effect are described in U.S. Pat. No. 4,951,144 to the present inventor for "Recursive Video Blur Effect", hereby incorporated by reference. This recursive blur effect mixes neighboring decayed pixels in a way that produces an "airbrushed" trails effect. When recursive blurring is used for "flying" text characters, the trails left behind are smooth and the edges of the characters from previous frames are softened, and this creates a pleasing effect relative to the comparative harshness of the unblurred trails.

When recursive blurring is combined with the rainbow trails of the present invention, the resulting hue changes become much more smooth and pleasing. As is explained in the U.S. Pat. No. 4,951,144 patent, recursive blurring is accomplished by inserting a low-pass filter inside the recursive loop 12,14,16 shown in FIG. 1. This causes the features of a video image to blur as well as fade with the passage of time and additional trips through the recursive loop.

FIGS. 6A and 6B show a discrete space folded FIR (finite impulse response) filter suitable for performing both horizontal recursive blurring and chrominance phase rotation simultaneously. This implementation is most appropriate for chrominance video components that are interleaved, but not cosited. The folded FIR filter acts as two filters, one for I samples and one for Q samples, each operating on alternate cycles.

While FIGS. 6A and 6B show only chrominance components, it is understood that parallel blurring circuitry is employed to perform the same blurring function on the luminance and the keying components of the same video signal. (Keying components are used to control the mixing of one video signal with another.)

As a particular video data element enters the filter, it passes sequentially through delay elements 40, 42, 44, 46 and 48, the center tap. On successive clocks, the same data element continues on through delay elements 50, 52, 54 and 56. The outputs of each pair of elements that are equally distant from the center tap form a symmetrical pair of taps and these are added together by the summing circuits 58-64 associated with each pair of these taps, for multiplication by the same coefficients in multipliers 66-72. The output of the center tap 48 is multiplied by its coefficient by multiplier 74.

Note that in this folded filter each pair of symmetrical taps is presenting the same chrominance component to its associated summing circuit, so that an I sample is added to an I sample and a Q sample is added to a Q sample. For example, in FIG. 6A at the time that element 48 contains $I_{2k}$, elements 56 and 40 contain $I_{2k-4}$ and $I_{2k+4}$, elements 54 and 42 contain $Q_{2k-3}$ and $Q_{2k+3}$, elements 52 and 44 contain $I_{2k-2}$ and $I_{2k+2}$, and elements 50 and 46 contain $Q_{2k-1}$ and $Q_{2k+1}$, respectively.

The coefficients applied to the multipliers in the circuit of FIGS. 6A and 6B specify the contour of the frequency response of the discrete space FIR filter within its local space. The more stages, i.e., pairs of delay elements or taps, the lower the bandpass can be made and the more blurring it can be made to produce.

The exact choice of coefficients is not essential to the invention, so long as they perform lowpass filtering and therefore blurring.

In FIG. 6A, the $I_{2k}$ value held in element 48 is multiplied by the coefficient $C_0$ times the cosine of $\theta$ by multiplier 74 and applied to one input of summation circuit 76. The $Q_{2k-1}$ value held by element 50 is summed with the $Q_{2k+1}$ value held by element 46 by summing circuit 64. The output of summing circuit 64 is multiplied by the negative of coefficient $C_1$ times the sine of $\theta$ by multiplier 72 and applied to another input of summation circuit 76. The same sort of calculation occurs for each pair of taps in the filter, but using different coefficients $C_n$. Each multiplier 66–72 presents its output to a different input of summation circuit 76. The output of summation circuit 76 is:

$$I'_{2k} = I_{2k,blurred} * \cos(\theta) \, Q_{2k,blurred} * \sin(\theta)$$

The word "blurred" as used above refers to the function of the filter. Assuming the following coefficients, $C_0 = \frac{3}{8}$, $C_2 = 3/16$ and $C_4 = \frac{1}{8}$, the value of $I_{2k,blurred}$ in the equation above is:

$$I_{2k,blurred} = \\ \tfrac{1}{8}*I_{2k-4} + 3/16*I_{2k-2} + \tfrac{3}{8}*I_{2k} + 3/16*I_{2k+2} + \tfrac{1}{8}*I_{2k+4}$$

And similarly, assuming the following coefficients, $C_3 = \frac{1}{8}$ and $C_1 = \frac{3}{8}$, the value of $Q_{2k,blurred}$ is:

$$Q_{2k,blurred} = \tfrac{1}{8}*Q_{2k-3} + \tfrac{3}{8}*Q_{2k-1} + \tfrac{3}{8}*Q_{2k+1} + \tfrac{1}{8}*Q_{2k+3}$$

Notice that because the Q samples in FIG. 6A do not have a single center tap, but are produced symmetrically around the center tap of the I values, the blurred Q value has the same timing, 2k, as the I value, and has been automatically cosited.

FIG. 6B shows the same circuit as is shown in FIG. 6A, but one clock cycle later. Each data value has advanced one location through elements 40–56, with the new value of $Q_{2k+5}$ appearing at the output of element 40. The summing circuits 58–64 perform in the same way, but with different data on their inputs. The multipliers 66–72 also function in the same way, except that the signs of coefficients $C_3$ and $C_1$ have been changed from negative to positive. The output of summation circuit 76 during this cycle, where "blurring" has the same significance as above and the I value is automatically cosited, is:

$$Q'_{2k+1} = I_{2k+1,blurred} * \sin(\theta) + Q_{2k+1,blurred} * \cos(\theta)$$

The circuitry shown in FIGS. 6A and 6B is technically accurate in producing a uniform hue rotation only for video containing non-cosited chrominance samples. To simultaneously perform chrominance phase rotation and blurring on video containing cosited chrominance samples, a non-folded FIR filter with two center taps could be used. However, such a filter requires twice as many multipliers, and technical accuracy is only marginally desirable for the vast majority of applications, so the circuit shown in FIGS. 6A and 6B is deemed to be the preferred embodiment, even for video containing cosited chrominance samples.

The delay elements 40–56 shown in FIGS. 6A and 6B, as well as those shown in FIG. 4 of the "Recursive Video Blur Effect" patent, could represent either pixel delays or line delays so that the filter could be either a horizontal filter or a vertical filter. However, combining hue rotation with the blurring function is only practical along the horizontal axis. Therefore, in FIG. 7 below, hue rotation and horizontal blurring have been combined in one operation, while the vertical blurring is accomplished with a separate filter. And, it should also be noted that the function of the decay multiplier 16 in FIG. 2 can also be performed integrally with either of the blurring functions by having the sum of the blur coefficients total the decay coefficient, $K_d$, instead of one.

FIG. 7 shows a recursive loop that generates decaying trails, causes recursive chrominance phase rotation and produces recursive blurring concurrently. In this recursive loop circuit, the chrominance phase rotation and horizontal blurring have been combined in a horizontal blur and chroma phase rotation circuit 80 (as shown in FIGS. 6A and 6B), while the vertical blurring and decay factor multiplication have been combined in a vertical blur and decay factor multiplier 90. The luminance and keying components of the video signal are provided with the same horizontal and vertical blurring and decay factor multiplication as the chrominance path receives by equivalent blur and decay processing circuit 100.

The modified frame delay circuit 14' must produce a delay that is shorter than a normal frame delay to allow time for the delays inherent in vertical blur and decay factor multiplier 90 and the equivalent treatment of the luminance and keying components, since multiple line delays exceed the vertical blanking interval. The extra time required will depend on the number of line delay elements needed to implement the vertical blur filter, i.e., how many taps are desired for the blurring function. In a FIFO-memory (first in, first out memory) implementation of the modified frame delay circuit 14', the delay is shortened by starting the readout as early as necessary to obtain correct time alignment at summing circuit 12 where the decayed, rotated and blurred video signal from the recursive loop is summed with the new incoming video.

To incorporate the decay factor multiplication concurrently with the blurring function, as described above, the blur coefficients provided to the vertical blur and decay factor multiplier 90 and to the equivalent blur and decay processing circuit 100 are calculated to total $K_d$ rather than one. The equivalent blur and decay processing circuitry also receives normal blur coefficients, that collectively total one, to allow filtering along one axis to be performed without any decay so that the signal is only made to decay once. To incorporate the chrominance phase rotation function concurrently with the horizontal blurring function, the blur coefficients to the horizontal blur and chroma phase rotation circuit 80 have been modified by being pre-multiplied with sine $\theta$ and cosine $\theta$ values, as they were shown and described in connection with FIGS. 6A and 6B.

While the decay factor multiplication has been shown combined with the blur filter in FIG. 7, it could also be combined with the chrominance phase rotation circuitry by using $K_d * \sin(\theta)$ and $K_d * \cos(\theta)$ instead of $\sin(\theta)$ and $\cos(\theta)$, respectively. Similarly, the decay factor multiplication could alternatively be combined with a combination of the chrominance phase rotation circuitry and blurring filter circuitry. In the latter case, the sine and cosine functions of $\theta$, the decay factor and the blurring coefficients would all be pre-multiplied together and used as described above.

The value used for the angle $\theta$ determines how fast the hue changes as a color video trail is generated. If for example, the decay factor used were leaving a trail that visibly persisted for about one second, and it were desired to have the colors associated with that trail go completely around the color circle in about the same interval, a $\theta$ value of 12° would provide 360° of hue rotation during the 30 frames that occur during one second.

It should also be noted that the sine and cosine of $\theta$ can be changed from frame-to-frame in any of the implementations provided above. If, for example, it were desired to have the rate of hue rotation change between two values over some interval of time, a microprocessor in the system could interpolate the corresponding sine and cosine values between those two rates on a frame-by-frame basis and supply the appropriate sine and cosine data to registers provided locally for holding the sine and cosine values during each frame.

In addition to rotating the hue of the chrominance component, other alterations, such as saturation modification, can be performed recursively. If a constant, based on key or luminance values, is added to both I and Q components, color can be made to appear in white and gray areas, or to disappear in colored areas, as the image decays and changes hue. For example, to add color selectively to areas having high key values, the following equations can be implemented by the saturation modification circuit 110 in FIG. 7:

$I' = I_{rotated} + C_1(K)$ $Q' = Q_{rotated} + C_2(K)$ where $C_1$ and $C_2$ define the color to be recursively added, and K is the controlling key or luminance signal.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true scope of the invention.

I claim:

1. An apparatus for creating decaying video afterimages with recursively altered chrominance characteristics, comprising:
   a recursive video loop having delaying means for delaying an output frame of video and combining means for combining the delayed output frame of video with an input frame of video to produce a next output frame of video; and
   means for altering color characteristics disposed within the recursive video loop for altering the chrominance content of the delayed output frame of video.

2. An apparatus according to claim 1 wherein the means for altering color characteristics comprises chrominance phase rotation means.

3. An apparatus according to claim 2 wherein the means for altering color characteristics further comprises saturation modification means.

4. An apparatus according to claim 1 wherein the means for altering color characteristics comprises saturation modification means.

5. An apparatus according to claim 2 wherein the chrominance phase rotation means is disposed before the delay means.

6. An apparatus according to claim 2 wherein the chrominance phase rotation means is disposed within the combining means.

7. An apparatus according to claim 2 wherein the chrominance phase rotation means is disposed after the delay means.

8. An apparatus according to claim 2 wherein the chrominance phase rotation means comprises:
   means for holding and shifting a plurality of chrominance A elements and chrominance B elements;
   means for generating from the held and shifted A and B elements rotated A elements $A_r$ according to the relationship $A_r = A^* \cos(\theta) - B^* \sin(\theta)$, and rotated B elements $B_r$ according to the relationship $B_r = A^* \sin(\theta) - B^* \cos(\theta)$.

9. An apparatus according to claim 2 further comprising:
   blurring means disposed within the recursive video loop for blurring the chrominance phase rotated decaying video afterimages as they decay.

10. An apparatus according to claim 9 wherein the chrominance phase rotation means and the blurring means are merged into a combined one axis blur filtering and chrominance phase rotating means capable of producing the chrominance phase rotated effect and the blurring effect along one axis concurrently.

11. A method for creating decaying video afterimages with recursively altered chrominance characteristics, the method comprising the steps of:
   in a recursive video loop, delaying an output frame of video and combining the delayed output frame of video with an input frame of video to produce a next output frame of video; and
   within the recursive video loop, altering the chrominance content of the delayed output frame of video.

12. A method according to claim 11 wherein the step of altering the chrominance content comprises the step of chrominance phase rotating the delayed output frame of video.

13. A method according to claim 12 wherein the altering step further comprises the step of modifying the color saturation of the delayed output frame of video within the recursive video loop.

14. A method according to claim 11 wherein the chrominance phase altering step comprises the step of modifying the color saturation of the delayed output frame of video within the recursive video loop.

15. A method according to claim 12 wherein the chrominance phase rotating step is performed before the delaying step.

16. A method according to claim 12 wherein the combining step comprises the chrominance phase rotation step.

17. A method according to claim 12 wherein the chrominance phase rotating step is performed after the delaying step.

18. A method according to claim 12 wherein the chrominance phase rotating step comprises the steps of:
   holding and shifting a plurality of interleaved chrominance A elements and chrominance B elements; and
   generating from the held and shifted A and B elements rotated A elements $A_r$ according to the relationship $A_r = A^* \cos(\theta) - B^* \sin(\theta)$, and rotated B elements $B_r$ according to the relationship $B_r = A^* \sin(\theta) - B^* \cos(\theta)$.

19. A method according to claim 12 further comprising the step of, within the recursive video loop, blurring the elements of the frame of output video.

20. A method according to claim 19 wherein the chrominance phase rotation step and the blurring step are performed concurrently by the step of filtering the elements of the frame of output video so that the output video is blurred along one axis while the chrominance phase is rotated by the angle $\theta$.

* * * * *